(12) United States Patent
Kang et al.

(10) Patent No.: US 9,223,174 B2
(45) Date of Patent: Dec. 29, 2015

(54) LIQUID CRYSTAL DISPLAY DEVICE INCLUDING LIGHT SOURCES EMITTING DIFFERENT COLORS

(71) Applicant: SAMSUNG DISPLAY CO., LTD., Yongin, Gyeonggi-Do (KR)

(72) Inventors: Jong-Hyuk Kang, Suwon-si (KR); Jung-Hyun Kwon, Seoul (KR); Jae-Byung Park, Seoul (KR); Dong-Hoon Lee, Hwaseong-si (KR); Hyun-Deok Im, Seoul (KR); Hyun-Min Cho, Hwaseong-Si (KR); Min-Ki Nam, Anseong-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 100 days.

(21) Appl. No.: 13/900,195

(22) Filed: May 22, 2013

(65) Prior Publication Data
US 2014/0192291 A1 Jul. 10, 2014

(30) Foreign Application Priority Data
Jan. 8, 2013 (KR) ........................ 10-2013-0001849

(51) Int. Cl.
*G02F 1/1335* (2006.01)
(52) U.S. Cl.
CPC ............... *G02F 1/133621* (2013.01); *G02F 2001/133622* (2013.01); *G02F 2201/52* (2013.01)
(58) Field of Classification Search
None
See application file for complete search history.

(56) References Cited

U.S. PATENT DOCUMENTS

| | | | |
|---|---|---|---|
| 2006/0038770 A1* | 2/2006 | Burkholder | 345/102 |
| 2007/0222743 A1* | 9/2007 | Hirakata | 345/102 |
| 2007/0246734 A1* | 10/2007 | Lee et al. | 257/103 |
| 2009/0140630 A1* | 6/2009 | Kijima et al. | 313/498 |
| 2010/0165001 A1* | 7/2010 | Savvateev et al. | 345/690 |
| 2010/0188322 A1* | 7/2010 | Furukawa | 345/83 |
| 2011/0068699 A1* | 3/2011 | Knapp | 315/158 |
| 2011/0140597 A1 | 6/2011 | Lee et al. | |
| 2011/0205259 A1* | 8/2011 | Hagood, IV | 345/690 |
| 2011/0273080 A1* | 11/2011 | Kimura et al. | 313/498 |
| 2012/0113671 A1* | 5/2012 | Sadasivan et al. | 362/602 |

FOREIGN PATENT DOCUMENTS

| | | |
|---|---|---|
| JP | 2006-119295 | 5/2006 |
| JP | 2012-027298 | 2/2012 |
| KR | 10-2003-0079215 | 10/2003 |

OTHER PUBLICATIONS

English Abstract for Publication No. 2006-119295.
English Abstract for Publication No. 10-2003-0079215.
English Abstract for Publication No. 2012-027298.

* cited by examiner

*Primary Examiner* — Richard Kim
(74) *Attorney, Agent, or Firm* — F. Chau & Associates, LLC (57) ABSTRACT

A display device includes a display panel having a first transparent subpixel, a second transparent subpixel and a third transparent subpixel. A light source part provides light to the display panel. The light source part including a first light source configured to generate red light, a second light source configured to generate green light and a third light source configured to generate blue light. The third light source includes a blue light emitting diode and a wavelength shift layer. The wavelength of the blue light emitted from the third light source has a first peak within a range of about 445 nm to about 450 nm and a second peak within a range of about 450 nm to about 540 nm.

21 Claims, 6 Drawing Sheets

LIQUID CRYSTAL DISPLAY DEVICE INCLUDING LIGHT SOURCES EMITTING DIFFERENT COLORS

This application claims priority to Korean Patent Application No. 10-2013-0001849, filed on Jan. 8, 2013, under 35 U.S.C. §119, the contents of which are incorporated by reference herein in its entirety.

TECHNICAL FIELD

The present disclosure relates to a liquid crystal display device, and more particularly, to a liquid crystal display device including a plurality of light sources emitting different colors.

DISCUSSION OF THE RELATED ART

Liquid crystal display (LCD) devices apply electric fields to specific molecules of liquid crystal to change the arrangement of the molecules and thereby change optical characteristics of liquid crystal cells such as birefringence, optical activity, dichroism and light scattering, etc. to display an image.

Generally, LCD devices cannot emit light, and accordingly, an external light source is required. Thus, the display device may utilize a backlight unit ("BLU") to supply light to display an image on a liquid crystal display panel.

The backlight unit includes a light source, for example, a cold cathode fluorescent lamp CCFL, an external electrode fluorescent lamp EEFL, a flat fluorescent lamp FFL, or a light emitting diode LED. The light source may be a point light source or a line light source.

In a conventional display device, a backlight unit generates a white light and a color filter in the display panel converts the white light to a desired light color. When the backlight unit generates a white light, 70% to 80% of the electric power consumption by the display device may be consumed in the light source part.

Recently, a field sequential display ("FSD") device has been developed. The FSD includes a transparent pixel instead of a color filter and a light source generating a specific color. A desired color may be obtained by mixing different lights. The field sequential display includes a plurality of light sources that are individually activated. Thus, electric power consumption may be reduced.

Generally, the FSD device may utilize a plurality of light sources, each of which having a different color. However, in a case where the FSD device includes a blue light emitting diode as the light source, the color gamut of the FSD device may not match well with the standard Red Green Blue (sRGB) gamut, compared to a conventional white light emitting diode Accordingly, a color reproduction of the display device may be deteriorated.

SUMMARY

Example embodiments of the present invention provide a display device capable of increasing color reproduction accuracy.

In accordance with an exemplary embodiment of the present invention, a display device includes a display panel and a light source part. The display panel includes a first transparent subpixel, a second transparent subpixel and a third transparent subpixel. The light source part provides light to the display panel and includes a first light source configured to generate red light and a second light source configured to generate green light and a third light source configured to generate blue light. The third light source includes a blue light emitting diode and a wavelength shift layer. The wavelength of the blue light emitted from the third light source has a first peak within a range of about 445 nm to about 450 nm and a second peak within a range of about 450 nm to about 540 nm.

In an exemplary embodiment of the present invention, the display device may further include a panel driving part configured to set grayscale data of the first transparent subpixel, the second transparent subpixel and the third transparent subpixel.

In an exemplary embodiment, the display device may further include a light source driving part configured to alternately turn on the first light source, the second light source and the third light source.

In an exemplary embodiment, the panel driving part may be synchronized with the light source driving part.

In an exemplary embodiment, the wavelength shift layer may include a matrix and a wavelength shift material dispersed in the matrix.

In an exemplary embodiment, the matrix may be a polystyrene, a polyimide, an epoxy, a silica glass, and/or a silica gel.

In an exemplary embodiment, the wavelength shift material may include an inorganic fluorescent substance.

In an exemplary embodiment, the inorganic fluorescent substance may be $Y_3A_{15}O_{12}$:Ce.

In an exemplary embodiment, the wavelength shift material may include a quantum dot.

In an exemplary embodiment, the quantum dot may include CdSe/ZnS and/or InP/ZnS.

In accordance with an exemplary embodiment, a display device includes a display panel and a light source part. The display panel includes a first subpixel, a second subpixel and a transparent subpixel. The light source part provides light to the display panel and includes a first light source configured to generate yellow light and a second light source configured to generate blue light. The second light source includes a blue light emitting diode and a wavelength shift layer. The wavelength of the blue light emitted from the second light source has a first peak within a range of about 445 nm to about 450 nm and a second peak within a range of about 450 nm to about 540 nm.

In an exemplary embodiment, the display device may further include a panel driving part configured to set grayscale data of the first subpixel, the second subpixel and the transparent subpixel.

In an exemplary embodiment, the display device may further include a light source driving part configured to alternately turn on the first light source, the second light source and the third light source in sequence.

In accordance with an exemplary embodiment, a liquid crystal display device may include a blue light emitting diode and a wavelength shift layer formed on a blue light emitting diode. Blue light emitted from the blue light emitting diode passes through the wavelength shift layer. The wavelength of the blue light has a first peak within a range of about 445 nm to about 450 nm and a second peak within a range of about 450 nm to about 540 nm.

For example, the wavelength of the blue light emitted from the blue light emitting diode has two peaks, one of a relatively short wavelength of from about 445 nm to about 450 nm and another of a relatively long wavelength of about 450 nm to about 540 nm.

Accordingly, a wavelength of the blue light of the display device may be shifted to a relatively long wavelength in CIE (Commission internationale de l'Echairage) 1931 color space, to thereby obtain a good color gamut match and increase a color reproduction thereof.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Hereinafter, exemplary embodiments of the present invention will be explained in detail with reference to the accompanying drawings.

Figure 1:
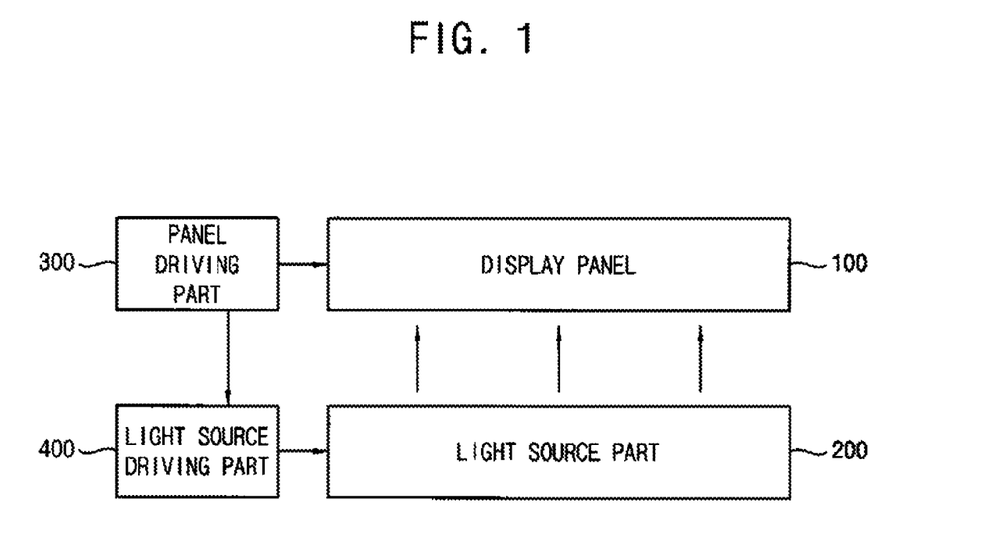
FIG. 1 is a block diagram illustrating a liquid crystal display device in accordance with an exemplary embodiment of the present invention.
Figure 2:
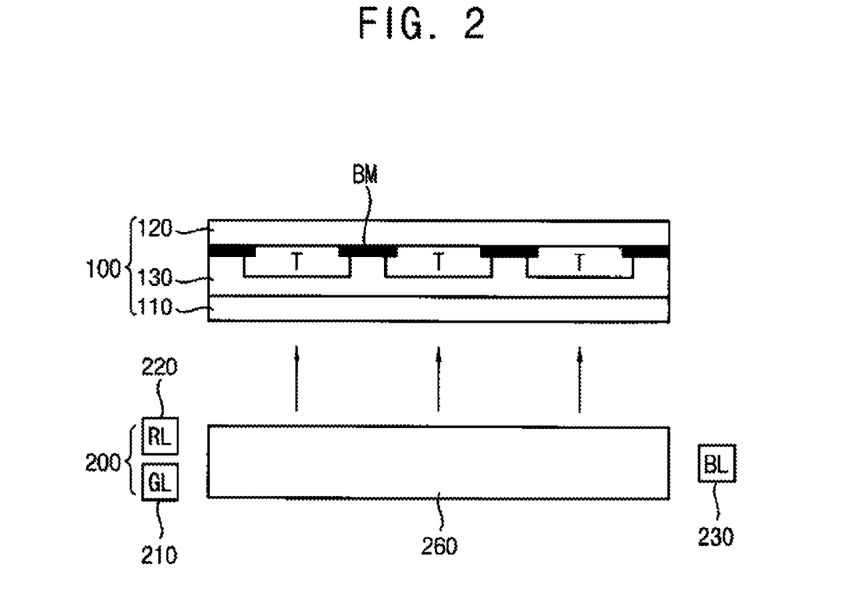
FIG. 2 is a cross-sectional view illustrating the liquid crystal display panel and the light source part of FIG. 1.
Figure 3:
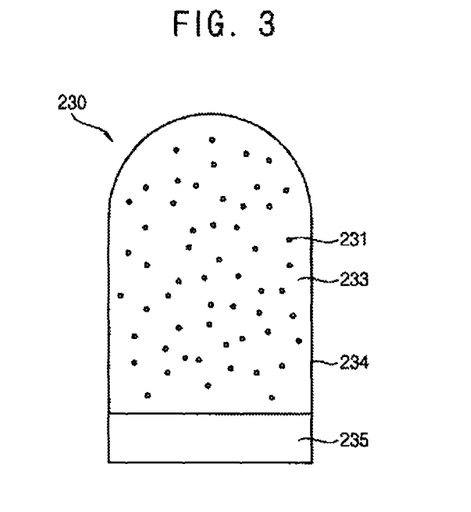
FIGS. 3 and 4 are cross-sectional views illustrating a blue light emitting diode in accordance with an exemplary embodiment of the present invention.
Figure 4:
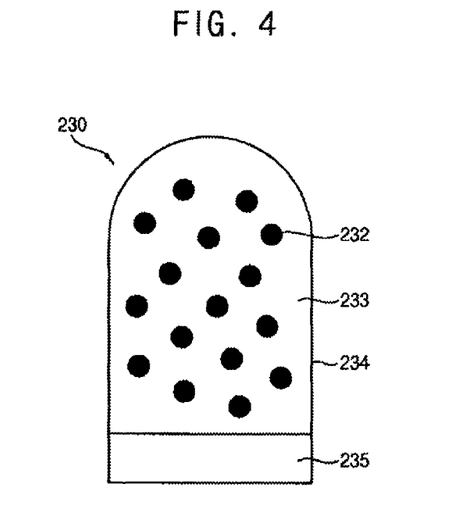

FIG. 1 is a block diagram illustrating a liquid crystal display device in accordance with an exemplary embodiment of the present invention. FIG. 2 is a cross-sectional view illustrating the liquid crystal display panel and the light source part of FIG. 1. FIGS. 3 and 4 are cross-sectional views illustrating a blue light emitting diode in accordance with exemplary embodiments.

Referring FIGS. 1 to 4, a liquid crystal display device may include a display panel 100, a light source part 200, a panel driving part 300 and a light source driving part 400.

The display panel 100 displays an image. The display panel 100 may include a first substrate 110, a second substrate 120 and a liquid crystal layer 130.

The display panel 100 may include a first transparent subpixel T, a second transparent subpixel T and a third transparent subpixel T.

The first substrate 110 and the second substrate 120 may each be a transparent insulation substrate. The transparent insulation substrate may include a glass substrate or a plastic substrate.

The first substrate 110 may be a thin film transistor substrate including thin film transistors ("TFTs"). The thin film transistor substrate includes a plurality of transistors, which are formed in a matrix shape. The first substrate may include a plurality of gate lines GL and a plurality of data lines DL, which are connected to the thin film transistor.

The liquid crystal LC layer 130 is disposed between the first substrate 110 and the second substrate 120. The second substrate 120 may include the transparent subpixels T, through which light from the light source part 200 penetrates. The transparent subpixels may be defined by a transparent color filter disposed on the second substrate 120. For example, the transparent color filter may include an empty space or a transparent resin layer. A black matrix BM may be disposed between the transparent subpixels.

The liquid crystal layer 130 may be disposed between the first substrate 110 and the second substrate 120.

The panel driving part 300 may be connected to the display panel 100 to drive the display panel 100. The panel driving part 300 may include a timing controller, a gate driving part and a data driving part (not illustrated).

The timing controller generates a first control signal and outputs the first control signal to the gate driving part to control a driving timing of the gate driving part. The timing controller generates a second control signal and outputs the second control signal to the data driving part to control a driving timing of the data driving part. The gate driving part outputs respective gate line signals to the gate lines. The data driving part outputs respective data signals to the data lines.

The panel driving part 300 may be configured to set grayscale data of the first transparent subpixel T, the second subpixel T and the third transparent subpixel T.

The panel driving part 300 outputs a light source control signal to control a driving timing of the light source driving part 400. The panel driving part 300 may be synchronized with the light source driving part 400.

The light source part 200 may include a first light source 210, a second light source 220 and a third light source 230. The light source part 200 may further include a light guide plate LGP 260. The light source part 200 generates light and provides the light to the display panel 100.

The first light source 210 may generate green light GL. The second light source 220 may generate red light RL. The third light source 230 may generate blue light BL.

A green color of the first light source 210, a red color of the second light source 220 and a blue color of the third light source 230 may be appropriately combined to produce a white color. The first light source, the second light source and the third light source may include, but are not limited to including, the green color, the red color and the blue color.

The first light source 210 may be a light emitting diode LED device generating a green color. The second light source 220 may be a light emitting diode LED device generating a red color.

Referring to FIGS. 3 and 4, the third light source 230 may include a light emitting diode LED device generating a blue color. For example, the third light source may include a blue light emitting diode 235 and a wavelength shift layer 234 on the blue light emitting diode 235.

The wavelength shift layer 234 may include a matrix 233 and a wavelength shift material 231, 232 dispersed in the matrix 233. The blue light emitted from the blue light emitting diode 235 penetrates through the wavelength shift layer 234 that is including the wavelength shift material, to have a wavelength within a range of about 450 nm to about 540 nm.

The matrix 233 may include polystyrene, polyimide, epoxy, silica glass, silica gel, etc. These substances may be used within the matrix 233 either alone or in combination.

The wavelength shift material 321 may include an inorganic fluorescent substance. The inorganic fluorescent substance may include one or more of: $ZnS:Ag,Al$, $ZnS:Ag$, $BaMgAl_{10}O_{17}:Eu,Mn$, $BaMg_2Al_{16}O_{27}:Eu(II)$, $(Ca,Sr,Ba)_3(PO_4)_2Cl_2:Eu$, $(Sr,Ca,Ba)_{10}(PO_4)_6Cl_2:Eu$, $BaMg_2Al_{16}O_{27}:Eu(II),Mn(II)$, $BaMgAl_{10}O_{17}:Eu,Mn$, $ZnS:Ag,Cl$, $ZnS:Zn$, $Sr_2P_2O_7:Sn(II)$, $MgWO_4$, $Sr_6P_5BO_{20}:Eu$, $Ca_5F(PO_4)_3:Sb$, $(Ba,Ti)_2P_2O_7:Ti$, $3Sr_3(PO_4)_2$, $SrF_2:Sb,Mn$, $ZnO:Zn$, $Sr_5F(PO_4)_3:Sb,Mn$, $Zn_2SiO_4:Mn,As$, $Zn_2SiO_4:Mn$, $Zn_2SiO_4:Mn,Sb_2O_3$, $ZnS:$ Cu,Al, ZnS:Cu,Al, ZnS:Cu,Au,Al, Y3(Al,Ga)5O12:Ce, Y3Al5O12:Ce, etc. These substances may be used within the wavelength shift material 321 either alone or in combination. For example, the fluorescent substance may be a Ce-doped phosphor, for example, Y3Al5O12:Ce, which has excellent heat resistance and optical stability.

The wave light shift material may include a quantum dot. The quantum dot may be a semiconductor nano particle having a shape of core, core/shell, or shell/core/shell.

The quantum dot having a shape of core and core/shell may include one or more of: CdTe, CdTe/CdS, CdTe/ZnS, CdTe/ZnSe, CdTe/CdS/ZnS, CdTe/ZnSe/ZnS, CdTe/ZnSe/CdS, CdTe/CdS/ZnSe, CdTe/ZnSe/CdS/ZnS, CdTe/CdS/ZnSe/ZnS, CdSe, CdSe/CdS, CdSe/ZnS, CdSe/ZnSe, CdSe/CdS/ZnS, CdSe/ZnSe/ZnS, CdSe/ZnSe/CdS, CdSe/CdS/ZnSe, CdSe/ZnSe/CdS/ZnS, CdSe/CdS/ZnSe/ZnS, CdS, ZnS, CdS/ZnS, CdS/ZnSe, CdS/ZnS, CdS/ZnSe/ZnS, CdS/ZnSe, CdS/ZnSe, CdS/ZnSe/ZnS, ZnP, ZnSe, ZnSe/ZnS, ZnSe/CdS, ZnSe/CdS/ZnS, ZnO, ZnO/ZnS, ZnTe, ZnTe/ZnSe, ZnTe/ZnS, ZnTe/ZnSe/ZnS, ZnTe/CdS, ZnTe/CdS/ZnSe/ZnS, ZnTe/ZnSe/ZnS, ZnTe/ZnSe/CdS/ZnS, ZnTe/CdS/ZnS, InP, InP/CdS, InP/ZnS, InP/ZnSe, InP/CdS/ZnS, InP/ZnSe/ZnS, InP/ZnSe/CdS, InP/CdS/ZnSe, InP/ZnSe/CdS/ZnS, InP/CdS/ZnSe/ZnS, InP/GaP/ZnS, InP/GaP/ZnSe/ZnS, InP/GaN, InP/GaP InP/GaP/GaN, GaP, GaN, GaP/GaN, InGaN, InN/GaN, etc. These substances may be used within the quantum dots either alone or in combination. The quantum dot having a shape of shell/core/shell may include one or more of ZnxCd1-xSeyS1-y/CdSeaS1-a/ZneCd1-eSegS1-g, ZnGaPS/InGaP/ZnGaPS, ZnSexS1-x/InP/ZnSeyS1-y, etc. These substances may be used within the quantum dot either alone or in combination. For example, the quantum dot 232 may include CdSe/ZnS or InP/ZnS.

Figure 6A:
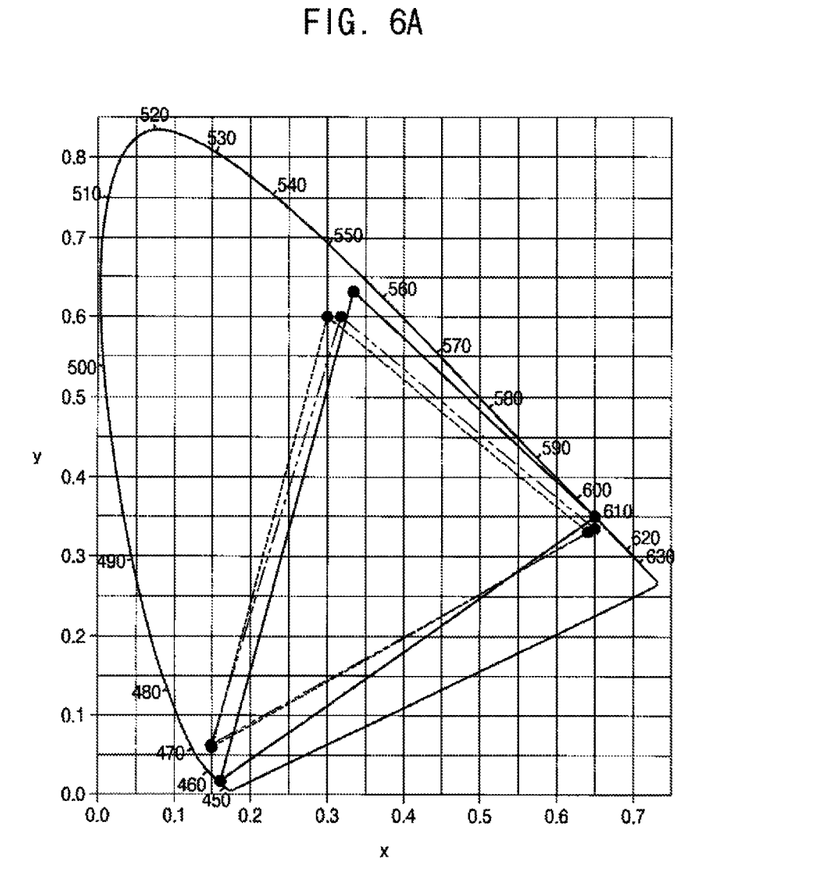
FIGS. 6A and 6B are graphs illustrating a color gamut in 1931 CIE xy chromaticity diagram to describe a color gamut change in accordance with the presence or absence of the blue light emitting diode of FIGS. 3 and 4.

Referring to FIGS. 3, 4 and 6A, a sRGB gamut is illustrated by a dotted line in 1931 CIE xy chromaticity diagram. The red color of the sRGB may be positioned at 0.6400(x-axis) and 0.3300(y-axis) in the xy-axis of 1931 CIE xy chromaticity diagram. The green color may be positioned at 0.3000(x-axis) and 0.3290(y-axis). The blue color may be positioned at 0.1500(x-axis) and 0.0600(y-axis). The white color may be positioned at 0.3127(x-axis) and 0.3290(y-axis).

The wavelength shift layer 234 may include the wavelength shift material 231, 232 of about 0% to about 10% by weight relative to the total weight (100% wt) of the wavelength shift layer and the matrix 233 of the remaining % by weight. For example, the content of the wavelength shift material may be within the range of about 0% to about 5% by weight.

When the content of the wavelength shift material is more than about 10% by weight, the color gamut difference may be increased, because a blue wavelength is shifted close to a white color position in 1931 CIE xy chromaticity diagram.

The blue light emitting diode device may include the wavelength shift layer 234 having the wavelength shift material, to thereby increase color gamut match with sRGB gamut in the 1931 CIE xy chromaticity diagram.

The light guide plate 260 may guide light generated from the first, second, third light sources 210, 220, 230 to the display panel 100.

The first light source 210 and the second light source 220 may be disposed on a first side of the light guide plate 260. The third light source 230 may be disposed on a second side of the light guide plate 260 opposite to the first side.

Alternatively, the first light source 210, the second light source 220 and the third light source 230 may be formed in one package, and disposed in only one side of the light guide plate 260.

The light source part 200 is illustrated in the figures but the light source part 200 is not limited to an edge-lit type including the light guide plate 260 and the first, second and third light source 210, 220, 230 disposed on a side of the light guide plate 260.

The light source part 200 may be of a direct type including a plurality of light sources provided along the entire lower surface of the display panel 100.

The display device may be, but is not limited to, a liquid crystal display device. For example, the display device may be an organic light emitting diode OLED display device.

The light source driving part 400 drives the light source part 200. The light source driving part 400 alternately turns on the first light source 210, the second light source 220 and the third light source 230.

For example, during a first subframe, the first light source 210 may be turned on while the second light source 220 and the third light source 230 are turned off. During a second subframe, the second light source 220 may be turned on while the first light source 210 and the third light source 230 are turned off. During a third subframe, the third light source 230 may be turned on while the first light source 210 and the second light source 220 are turned off.

A period of the first subframe may be substantially identical to those of the second frame and the third subframe. Alternatively, the period of the first subframe may be different from those of the second subframe and the third subframe.

Accordingly, the display panel may be applied to Field Sequential Display FSD.

The blue light emitting diode device of the liquid crystal display device in accordance with an exemplary embodiment may include a wavelength shift layer having the wavelength shift material to obtain a good color gamut match and thus increase a color reproduction thereof. Furthermore, the light sources having different colors may be alternately turned on and off, to thereby reduce electric power consumption.

Figure 5A:
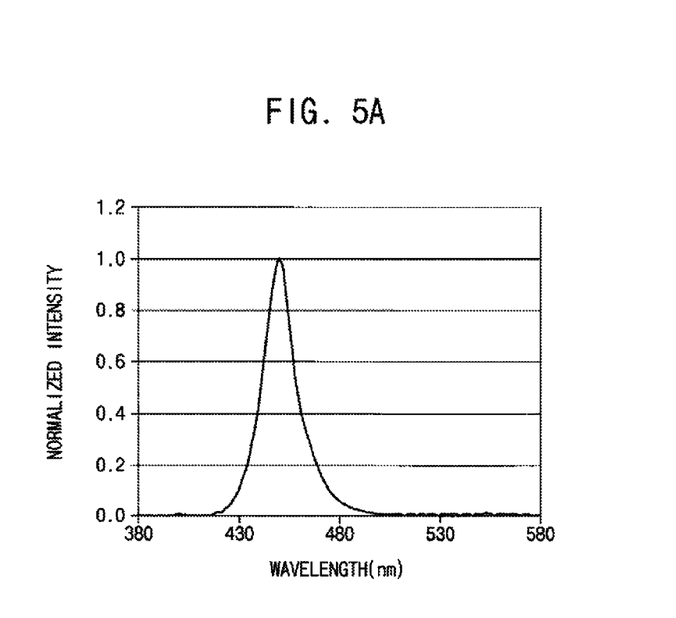
FIGS. 5A and 5B are graphs illustrating a peak change of blue light emitted from the blue light emitting diode of FIGS. 3 and 4.
Figure 5B:
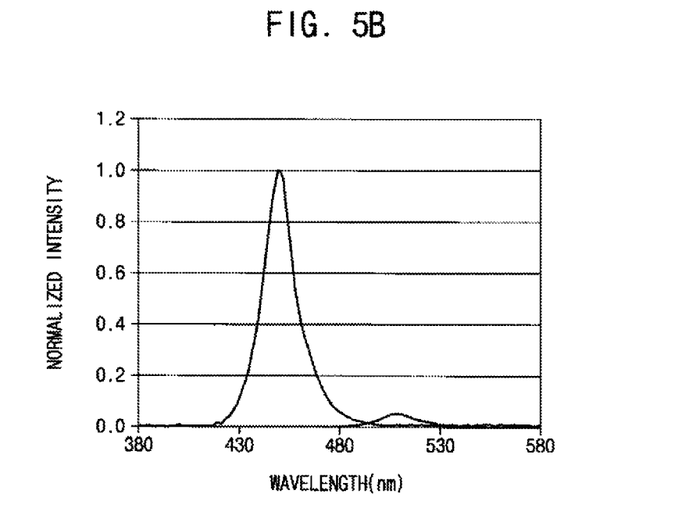

FIGS. 5A and 5B are graphs illustrating a peak change of a blue light that emitted from the blue light emitting diode of FIGS. 3 and 4.

Referring to FIG. 5A, blue light emitted from a blue light emitting diode may include a peak within a range of about 445 nm to about 450 nm. The blue light emitting diode may have a better luminance efficiency for blue light within a range of about 445 nm to about 450 nm in comparison to another range.

Referring to FIG. 5B, when blue light emitted from a blue light emitting diode penetrates a wavelength shift layer 214, the wavelength of the blue light may have two peaks. Two peaks have a first peak within a range of about 445 nm to about 450 nm and a second peak within a range of about 450 nm to about 540 nm. For example, the second peak may have a peak within a range of about 460 nm to about 490 nm.

Figure 6B:
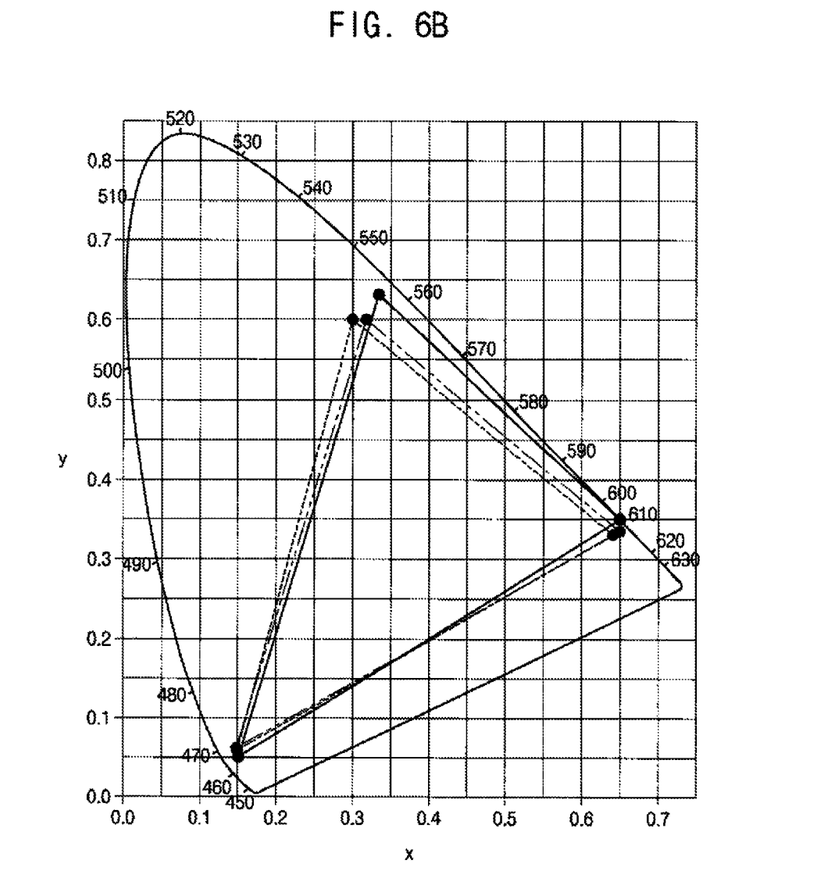

FIGS. 6A and 6B are graphs illustrating a color gamut in 1931 CIE xy chromaticity diagram showing a color gamut change in accordance with the presence or absence of the blue light emitting diode of FIGS. 3 and 4.

The dotted line shows sRGB garmut in 1931 CIE xy chromaticity diagram. The red color of the sRGB may be positioned at 0.6400(x-axis) and 0.3300(y-axis) in the xy-axis. The green color of the sRGB may be positioned at 0.3000(x-axis) and 0.6000(y-axis). The blue color of the sRGB may be positioned at 0.1500(x-axis) and 0.0600(y-axis).

The solid line shows a color gamut of a device including a blue light emitting device according to an exemplary embodiment of the present invention, and the chain double-dashed line shows a color gamut of a device including a conventional white light emitting device.

When a wavelength of the blue color is a range of about 465 nm to about 470 nm, which is positioned at 0.1500(x-axis) and 0.0600(y-axis) in 1931 CIE xy chromaticity diagram, a good color gamut match may be obtained to increase a color reproduction thereof. However, when blue light has only a single peak within a range of 465 to about 470 nm, luminance efficiency of the blue light may be decreased.

Referring to FIGS. 5B and 6B, in an exemplary embodiment, when blue light emitted from a blue light emitting diode device penetrates a wavelength shift layer 214, the wavelength of the blue light may have two peaks. Two peaks have a first peak within a range of about 445 nm to about 450 nm and a second peak within a range of about 450 nm to about 540 nm. Thus, the wavelength of the blue light may be shifted from about 445 nm-450 nm to about 470 nm in 1931 CIE xy chromaticity diagram. Accordingly, a good color gamut match may be obtained to thereby increase a color reproduction thereof.

In accordance with an exemplary embodiment, a wavelength shift layer 234 is provided to cover a blue light emitting diode such that blue light from the wavelength shift layer has a first peak within a range of about 445 nm to about 450 nm as a main peak which has excellent luminance efficiency and a second peak within a range of about 450 nm to about 540 nm. Thus, the wavelength of the blue light may be shifted to a relatively long wavelength region in 1931 CIE xy chromaticity diagram.

Figure 7:
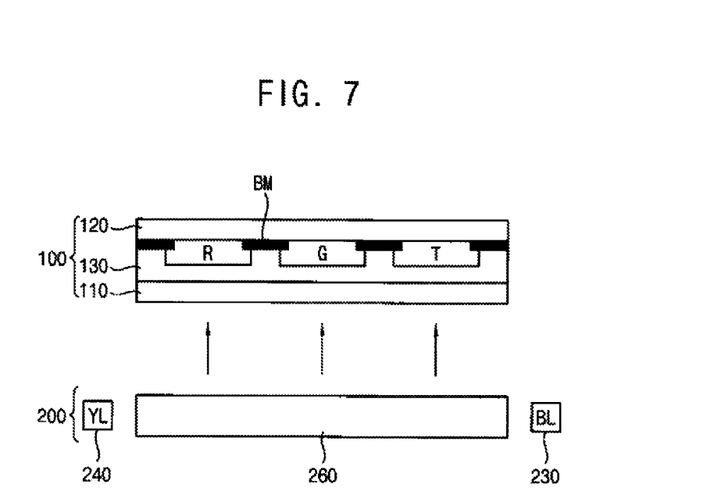
FIG. 7 is a cross-sectional view illustrating a liquid crystal display panel and a light source part in accordance with an exemplary embodiment of the present invention.

FIG. 7 is a cross-sectional view illustrating a liquid crystal display panel and a light source part in accordance with an exemplary embodiment of the present invention.

The blue light emitting diode and the liquid crystal display device in accordance with an exemplary embodiment are substantially the same as the blue light emitting diode and the liquid crystal display device in FIGS. 1 to 4 except that a first subpixel has a red subpixel, the second subpixel has a blue subpixel, the third light source is a blue light source and the fourth light source is a yellow light source. Thus, the same reference numerals will be used to refer to the same or like parts as those described in FIGS. 1 to 4 and any repetitive explanation concerning the above elements will be omitted.

Referring to FIGS. 1, 3 and 7, a liquid crystal display device may include a display panel 100, a light source part 200, a panel driving part 300 and a light source driving part 400.

The display panel 100 may include a first subpixel R configured to output only a first primary color, a second subpixel G configured to output only a second primary color, and a transparent subpixel T.

According to an exemplary embodiment, the first primary color may be red and the first subpixel is a red subpixel R. The second primary color may be green and the second subpixel is a green subpixel G.

The first subpixel R may be defined by a red color filter disposed on the second substrate 120. The second subpixel G may be defined by a green color filter disposed on the second substrate 120. The transparent subpixel T may be defined by a transparent color filter disposed on the second substrate 120. For example, the transparent color filter may be an empty space or a transparent resin layer. A black matrix BM may be disposed between the color filters.

The liquid crystal layer 130 may be disposed between the first substrate 110 and the second substrate 120.

The panel driving part 300 may be configured to set grayscale data of the first subpixel R, the second subpixel G and the transparent subpixel T.

The light source part 200 may include a third light source 230, and a fourth light source 240. The light source part 200 may further include a light guide plate LGP 260. The light source part 200 generates a light, and provides the light to the display panel 100.

The third light source 230 may generate a third primary color. The third primary color may be blue.

The fourth light source 240 may generate a color that is a mixed color of the first primary color and the second primary color. For example, the first primary color is red and the second primary color is green, thus the red color and the green color may be appropriately combined to produce a yellow color.

The panel driving part 300 outputs a light source control signal to control a driving timing of the light source driving part 400. The panel driving part 300 may be synchronized with the light source driving part.

The light source part 200 may include a third light source 230 and a fourth light source 240. The light source part 200 may further include a light guide plate LGP 260. The light source part 200 generates light, and transmits the generated light to the display panel 100.

The third light source 230 may generate blue light BL. The fourth light source 240 may generate yellow light Y.

The first primary color, the second primary color and the third primary color may be appropriately combined to produce a white color. The first primary color, the second primary color and the third primary color may be different colors than green, red color and blue.

The fourth light source 240 may be a light emitting diode LED device. The third light source 230 may be a light emitting diode device that generates a blue color.

The blue light emitting diode device in accordance with an exemplary embodiment of the present invention may include a wavelength shift layer 234 having the wavelength shift material to obtain a good color gamut match.

The light guide plate 260 may guide light emitted from the third light source 230 and the fourth light source 240 to the display panel 100.

The third light source 230 may be disposed on a first side of the light guide plate 260. The fourth light source 240 may be disposed on a second side of the light guide plate 260 opposite to the first side.

Alternatively, the third light source 230 and the fourth light source 240 may be formed in one package, and disposed in only one side of the light guide plate 260. The third light source 230 and the fourth light source 240 may, for example, be formed in one chip, which includes a blue light emitting diode and a yellow fluorescent substance.

The light source part 200 is illustrated but not limited to an edge-lit type including the light guide plate 260 and the first, second and third light source 210, 220, 230 disposed on a side of the light guide plate 260.

The light source part 200 may be a direct type including a plurality of light sources provided along the entire lower surface of the display panel 100.

The light source driving part 400 drives the light source part 200. The light source driving part 400 alternately turns on the third light source 230 and the fourth light source 240. For example, during a first subframe, the third light source 230 may be turned on while the fourth light source 240 is turned off. During a second subframe, the fourth light source 240 may be turned on while the third light source 230 is turned off.

A period of the first subframe may be substantially identical to a period of the second frame. Alternatively, the period of the first subframe may be different from the period of the second subframe.

The blue light emitting diode device of the liquid crystal display device in accordance with an exemplary embodiment may include a wavelength shift layer having the wavelength shift material to obtain a good color gamut match and thus increase a color reproduction thereof. Furthermore, the light sources having different colors may be alternately turned on and off, to thereby reduce electric power consumption.

Figure 8:
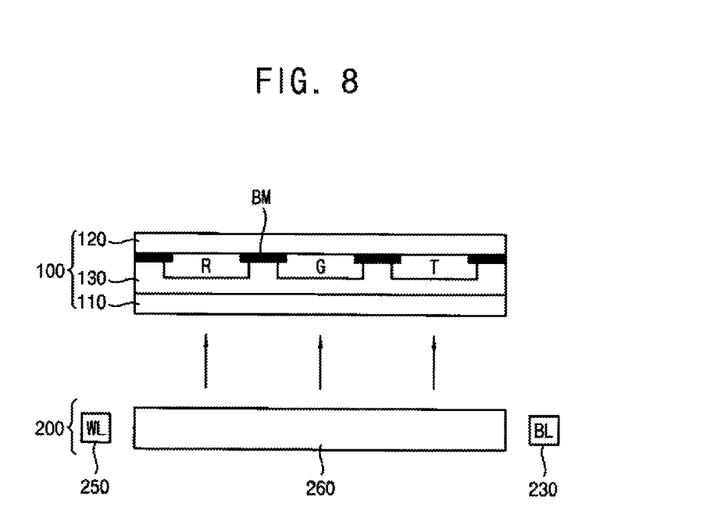
FIG. 8 is a cross-sectional view illustrating a liquid crystal display panel and a light source part in accordance with an exemplary embodiment of the present invention.

FIG. 8 is a cross-sectional view illustrating a liquid crystal display panel and a light source part in accordance with an exemplary embodiment of the present invention.

The blue light emitting diode and the liquid crystal display device in accordance with an exemplary embodiment are substantially the same as the blue light emitting diode and the liquid crystal display device in FIG. 5 except that a fifth light source is a white light source. Thus, the same reference numerals will be used to refer to the same or like parts as those described in FIGS. 1 to 4 and any repetitive explanation concerning the above elements will be omitted.

Referring to FIGS. 1, 3, 6 and 8, a liquid crystal display device may include a display panel 100, a light source part 200, a panel driving part 300 and a light source driving part 400.

The display panel 100 may include a first subpixel R configured to output only a first primary color, a second subpixel G configured to output only a second primary color and a transparent subpixel T.

The first subpixel R may be defined by a red color filter disposed on the second substrate 120. The second subpixel G may be defined by a green color filter disposed on the second substrate 120. The transparent subpixel T may be defined by a transparent color filter disposed on the second substrate 120. For example, the transparent color filter may be an empty space or a transparent resin layer. A black matrix BM may be disposed between the color filter.

The light source part 200 may include a third light source 230, and a fifth light source 250. The light source part 200 may further include a light guide plate LGP 260. The light source part 200 generates light, and transmits the generated light to the display panel 100.

The third light source 230 may generate a third primary color. The third primary color may be blue.

The fifth light source 250 may generate a color that is a mixed color of the first primary color, the second primary color and the third primary color. For example, the first primary color is red, the second primary color is green and the third primary color is blue, thus the red color, the green color and the blue color may be appropriately combined to produce a white color.

The panel driving part 300 outputs a light source control signal to control a driving timing of the light source driving part 400. The panel driving part 300 may be synchronized with the light source driving part.

The light source part 200 may include a third light source 230 and a fifth light source 250. The light source part 200 may further include a light guide plate LGP 260. The light source part 200 generates light, and provides the generated light to the display panel 100.

The third light source 230 may generate blue light. The fifth light source 250 may generate white light.

In an exemplary embodiment, the fifth light source 250 may be a light emitting diode LED device. The third light source 230 may be a light emitting diode device which generates blue light.

The blue light emitting diode device in accordance with an exemplary embodiment may include a wavelength shift layer 234 having the wavelength shift material to obtain a good color gamut match.

The light guide plate 260 may guide light emitted from the third light source 230 and the fourth light source 240 to the display panel 100.

The third light source 230 may be disposed on a first side of the light guide plate 260. The fifth light source 250 may be disposed on a second side of the light guide plate 260 opposite to the first side.

Alternatively, the third light source 230 and the fifth light source 250 may be formed in one package, and disposed in only one side of the light guide plate 260.

According to an exemplary embodiment, the light source part 200 is illustrated but not limited to an edge-lit type including the light guide plate 260 and the first, second and third light source 210, 220, 230 disposed on a side of the light guide plate 260.

The light source part 200 may be a direct type including a plurality of light sources provided along the entire lower surface of the display panel 100.

The light source driving part 400 drives the light source part 200. The light source driving part 400 alternately turns on the third light source 230 and the fifth light source 250 in sequence. For example, during a first subframe, the third light source 230 may be turned on while the fifth light source 250 is turned off. During a second subframe, the fifth light source 250 may be turned on while the third light source 230 is turned off.

A period of the first subframe may be substantially identical to a period of the second frame. Alternatively, the period of the first subframe may be different from the period of the second subframe.

Accordingly, the display panel may be applied to Dichromatic Field Sequential Display DFSD.

The blue light emitting diode device of the liquid crystal display device in accordance with exemplary embodiments of the present invention may include a wavelength shift layer having the wavelength shift material to obtain a good color gamut match and thus increase a color reproduction thereof. Furthermore, the light source having different colors may be alternately turned on and off, to thereby reduce electric power consumption.

The foregoing examples are provided as illustrative of the present invention and is the examples provided are not to be construed as limiting the present inventive concept. Although a few exemplary embodiments of the present invention have been described, those skilled in the art will readily appreciate that many modifications are possible in the exemplary embodiments without materially departing from the teachings and aspects of the present invention.

What is claimed is:
1. A display device comprising:
 a display panel including a first transparent subpixel, a second transparent subpixel and a third transparent subpixel; and
 a light source part providing light to the display panel, and the light source part including a first light source configured to generate red light, a second light source configured to generate green light and a third light source configured to generate blue light,
 wherein the third light source includes a blue light emitting diode and a wavelength shift layer, and
 wherein the blue light penetrates through the wavelength shift layer, and a wavelength of the blue light emitted from the third light source and through the wavelength shift layer has a first peak within a range of about 445 nm to about 450 nm and a second peak within a range of about 450 nm to about 540 nm.

2. The display device of claim 1, further comprising:
a panel driving part configured to set grayscale data for driving the first transparent subpixel, the second transparent subpixel and the third transparent subpixel.

3. The display device of claim 1, further comprising:
a light source driving part configured to sequentially activate and deactivate the first light source, the second light source and the third light source.

4. The display device of claim 1, wherein the panel driving part is synchronized with the light source driving part.

5. The display device of claim 1, wherein the wavelength shift layer comprises a matrix and a wavelength shift material dispersed in the matrix.

6. The display device of claim 5, wherein the matrix comprises polystyrene, polyimide, epoxy, silica glass, or silica gel.

7. The display device of claim 5, wherein the wavelength shift material comprises an inorganic fluorescent substance.

8. The display device of claim 7, wherein the inorganic fluorescent substance is $Y_3Al_5O_{12}$:Ce.

9. The display device of claim 5, wherein the wavelength shift material comprises a quantum dot.

10. The display device of claim 9, wherein the quantum dot comprises CdSe/ZnS or InP/ZnS.

11. A display device comprising:
a display panel including a first subpixel having a red color, a second subpixel having a green color and a transparent subpixel; and
a light source part providing a light to the display panel and including a first light source configured to generate yellow light, and a second light source configured to generate blue light,
wherein the second light source includes a blue light emitting diode, and a wavelength shift layer, and
wherein the blue light penetrates through the wavelength shift layer, and a wavelength of the blue light emitted from the second light source and through the wavelength shift layer has a first peak within a range of about 445 nm to about 450 nm and a second peak within a range of about 450 nm to about 540 nm.

12. The display device of claim 11, further comprising:
a panel driving part configured to set grayscale data of the first subpixel, the second subpixel and the transparent subpixel.

13. The display device of claim 11, further comprising:
a light source driving part configured to alternately activate and deactivate the first light source and the second light source.

14. The display device of claim 11, wherein the panel driving part is synchronized with the light source driving part.

15. The display device of claim 11, wherein the wavelength shift layer comprises a matrix and a wavelength shift material dispersed in the matrix.

16. The display device of claim 15, wherein the matrix comprises polystyrene, polyimide, epoxy, silica glass, or silica gel.

17. The display device of claim 15, wherein the wavelength shift material comprises an inorganic fluorescent substance.

18. The display device of claim 17, wherein the inorganic fluorescent substance is $Y_3Al_5O_{12}$:Ce.

19. The display device of claim 15, wherein the wavelength shift material comprises a quantum dot.

20. The display device of claim 19, wherein the quantum dot comprises CdSe/ZnS or InP/ZnS.

21. A display device comprising:
a set of transparent subpixels; and
a light source part providing light to the set of transparent subpixels, the light source part including a first light source configured to generate red light, a second light source configured to generate green light and a third light source configured to generate blue light,
wherein the third light source includes a blue light emitting diode and a wavelength shift layer,
wherein the blue light penetrates through the wavelength shift layer, and the wavelength shift layer is configured to shift a wavelength of the blue light emitted from the third light source and through the wavelength shift layer to a longer wavelength having a first peak within a range of about 445 nm to about 450 nm and a second peak within a range of about 450 nm to about 540 nm.

* * * * *